United States Patent
Yayoi et al.

(10) Patent No.: US 7,130,849 B2
(45) Date of Patent: Oct. 31, 2006

(54) SIMILARITY-BASED SEARCH METHOD BY RELEVANCE FEEDBACK

(75) Inventors: Takaaki Yayoi, Yokohama (JP); Tadataka Matsubayashi, Kawasaki (JP); Yasuhiko Inaba, Yokohama (JP); Yuichi Ogawa, Yokohama (JP); Shinya Yamamoto, Kobe (JP); Masayuki Hamakawa, Funabashi (JP)

(73) Assignee: Hitachi, Ltd., Tokyo (JP)

( * ) Notice: Subject to any disclaimer, the term of this patent is extended or adjusted under 35 U.S.C. 154(b) by 681 days.

(21) Appl. No.: 10/353,789

(22) Filed: Jan. 28, 2003

(65) Prior Publication Data
US 2003/0149704 A1    Aug. 7, 2003

(30) Foreign Application Priority Data
Feb. 5, 2002 (JP) ............................. 2002-027538

(51) Int. Cl.
*G06F 17/30* (2006.01)
(52) U.S. Cl. ................. 707/5; 707/3; 707/10; 707/102; 704/7; 709/201; 709/217
(58) Field of Classification Search ............... 707/1, 707/3, 5, 6, 10, 100, 200, 4, 102, 104.1; 709/229, 709/201, 217; 704/7, 10
See application file for complete search history.

(56) References Cited

U.S. PATENT DOCUMENTS 5,870,740 A * 2/1999 Rose et al. .................... 707/5
5,893,065 A * 4/1999 Fukuchi ....................... 704/500
6,012,053 A * 1/2000 Pant et al. ..................... 707/3

(Continued)

FOREIGN PATENT DOCUMENTS

JP    06-301722    10/1994

(Continued)

*Primary Examiner*—Shahid Alam
(74) *Attorney, Agent, or Firm*—Townsend and Townsend and Crew LLP

(57) ABSTRACT

A method for retrieving information from a computer system including a user terminal and a storage area, includes retrieving first information from the storage area using a first search query, the first search query having a first element and a first weight that is associated with the first element. The first search query has been formulated to retrieve target information. The first information includes at least a first data block. Second information is retrieved from the storage area using a second search query. The second search query has the first element, and a second weight that is associated with the first element. The second search query is derived from a relevance feedback provided on the first data block of the first information. An end-search criterion is provided to the user terminal. The end-search criterion provides information as to whether or not to end a first retrieval procedure for the target information. The first retrieval procedure being associated with a search query set, the search query set including a plurality of search queries, each having the first element.

17 Claims, 14 Drawing Sheets

U.S. PATENT DOCUMENTS

| | | | |
|---|---|---|---|
| 6,347,315 B1 * | 2/2002 | Kiyoki et al. | 707/5 |
| 6,397,212 B1 * | 5/2002 | Biffar | 707/5 |
| 6,473,754 B1 * | 10/2002 | Matsubayashi et al. | 707/5 |
| 6,519,647 B1 * | 2/2003 | Howard et al. | 709/229 |
| 6,556,992 B1 * | 4/2003 | Barney et al. | 707/6 |
| 6,665,659 B1 * | 12/2003 | Logan | 707/3 |
| 6,772,150 B1 * | 8/2004 | Whitman et al. | 707/6 |
| 6,785,688 B1 * | 8/2004 | Abajian et al. | 707/102 |
| 6,842,761 B1 * | 1/2005 | Diamond et al. | 707/104.1 |
| 6,877,002 B1 * | 4/2005 | Prince | 707/5 |
| 6,941,300 B1 * | 9/2005 | Jensen-Grey | 707/4 |
| 6,970,863 B1 * | 11/2005 | Cragun et al. | 707/3 |
| 2004/0117407 A1 * | 6/2004 | Kumar et al. | 707/200 |

FOREIGN PATENT DOCUMENTS

| | | |
|---|---|---|
| JP | 09-309078 | 12/1997 |
| JP | 2000-231563 | 8/2000 |
| JP | 2001-022787 | 1/2001 |
| JP | 2001-117937 | 4/2001 |

* cited by examiner

SIMILARITY-BASED SEARCH METHOD BY RELEVANCE FEEDBACK

CROSS-REFERENCES TO RELATED APPLICATIONS

The present application is related to and claims priority from Japanese Patent Application No. 2002-027538, filed on Feb. 5, 2002.

BACKGROUND OF THE INVENTION

The present invention relates to a method and apparatus for retrieving a database storing electronic data such as documents, images, and the like using a relevance feedback.

In recent years, as electronic data increases, there is an increasing demand for retrieving the electronic data more efficiently. In order to satisfy such demand, the so-called similarity-based retrieval is used as a retrieval technique. The similarity-based retrieval techniques include the relevant documents retrieval for retrieving documents similar to those specified in a query, the relevant image retrieval for retrieving images similar to those specified in a query, etc. The following description uses the relevant documents retrieval as an example to explain the similarity-based retrieval.

The relevant document retrieval or search process involves a query and one or more documents to be retrieved (hereafter referred to as a "retrieval-oriented document") as vectors each of which elements is occurrence information about a character string capable of being an independent word (hereafter referred to as a "characteristic string"). The document retrieval process calculates an inner product of the query's vector (hereafter referred to as a "query vector") and the retrieval-oriented document's vector (hereafter referred to as a "registered document vector") as similarity of the retrieval-oriented document for the query. As a result, desired documents can be effectively retrieved by referencing the retrieval-oriented documents in ascending order of the calculated similarities.

If a user does not properly specify desired documents or input an appropriate query, the documents retrieved are not relevant to the user's needs.

As a technology to solve this problem, a relevance feedback search method has been proposed in JP-A No. 117937/2001, for example, where the user provides relevance evaluation of the retrieved documents. The query is modified based on the evaluation. The modified query is used to perform another search. The relevance feedback is described.

FIG. 2 is used to describe an outline of the relevant documents retrieval method according to a conventional technique, e.g., the JP-A No. 117937/2001.

The relevant document retrieval in this description expresses a query and a retrieval-oriented document as a query vector and a registered document vector, respectively, whose elements are term frequencies of a characteristic string. The retrieval then calculates the similarity of the registered document vector to the query vector. The conventional technique uses Eq. 1 to calculate the similarity.

$$S(D) = \sum_{i}^{T} \{Frq(i, D) \times w(i)\} \qquad \text{Eq. 1}$$

where S(D) is the similarity of registered document vector D to the query vector, T the number of characteristic string differences (total number of different characteristic strings), Frq(i,D) the term frequency of characteristic string i in document D, and w(i) the weight for characteristic string i of the query vector determined by the term frequency of characteristic string i in documents specified in the query.

A query vector 201 in FIG. 2 has weight 3 for a characteristic string A, weight 2 for a characteristic string B, weight 2 for a characteristic string C, weight 3 for a characteristic string D, and weight 1 for a characteristic string E. Here, the query vector 201 is expressed as (3,2,2,3,1). A database 202 registers registered document vector (1,1,1,0,1) for a document 1 containing one characteristic string A, one characteristic string B, one characteristic string C, and one characteristic string E; registered document vector (1,1,1,0,0) for a document 2 containing one characteristic string A, one characteristic string B, and one characteristic string C; and registered document vector (0,1,0,1,1) for a document 3 containing one characteristic string B, one characteristic string D, and one characteristic string E.

When the relevant document retrieval process is executed, a similarity calculation and sort process 203 calculates similarities of the registered document vectors in the database 202 to the query vector 201 according to Eq. 1. The documents are sorted in descending order of the similarities. Consequently, a retrieved result 204 is obtained, showing similarity 8 for the document 1, 7 for the document 2, and 6 for the document 3.

FIG. 2 is also used to explain an outline of relevance feedback processing according to the conventional technique in addition to the relevant document retrieval process described above. The example in FIG. 2 shows processes when a user evaluates the document 3 in the retrieved result 204 to be "relevant," i.e., the document is a target document sought by the user or significantly relates to such a document. The conventional technique modifies characteristic string weights in the query vector according to Equation 2.

$$w'(i) = w(i) + \alpha \sum_{j}^{P} FP(j) - \beta \sum_{k}^{N} FN(k) \qquad \text{Eq. 2}$$

where w'(i) is a new weight for characteristic string i, w(i) the original weight, FP(j) the term frequency of characteristic string i included in the jth document evaluated to be "relevant", and FN(k) the term frequency of characteristic string i included in the kth document evaluated to be "not relevant," i.e., the document is not a target document sought by the user or significantly relates to such a document. In the equation 2, P is the number of documents evaluated to be "relevant" and N is the number of documents evaluated to be "not relevant". The process example uses parameters a and b each of which is set to 1.

When a user evaluates the document 3 to be "relevant" at a user's evaluation 205, an evaluation result read process 206 reads the evaluation result.

According to the evaluation result, a registered document vector acquisition process 207 obtains a registered document vector 208 for the document 3 from the database 202.

Using Eq. 2, a query vector modification process 209 adds the weight of each characteristic string in the registered document vector 208 of the document 3 to each element of the query vector 201. The query vector 201 is modified as a query vector 201*a* having weights of (3,3,2,4,2).

Then, a similarity or relevance calculation and sort process 210 calculates similarities for the registered document vector in the database 202 using the query vector 201*a*, resulting in similarity 10 for the document 1, similarity 8 for the document 2, and similarity 9 for the document 3. Consequently, the retrieval-oriented documents are sorted in descending order of the similarities to obtain a retrieved result 211 after the relevance feedback (hereafter referred to as a second retrieved result) which advances the rank for the document 3 evaluated to be "relevant".

In this manner, the conventional technique can improve the retrieval accuracy by using the relevance feedback. However, the relevance feedback makes it difficult for the user to determine when to terminate the retrieval.

FIG. 3 illustrates the above-mentioned problem specifically. The relevance feedback is performed by evaluating the document 5 in a first retrieved result 301 (also referred to as, "reference search result") to be "relevant". In one case, a large rank change is found in the transition from the first retrieved result 301 to a second retrieved result 302 (also referred to as, "subsequent search result"). In the other case, a small rank change is found in the transition from the retrieved result 301 to the second retrieved result 302

BRIEF SUMMARY OF THE INVENTION

The relevance feedback method according to one embodiment of the present invention comprises the following retrieval steps.
(1) An evaluation content read step for reading an identifier to identify a document evaluated by the user and evaluation contents.
(2) A unrefined search (or first search) information storage step for storing a retrieved result and a query before a refined search (or second search)based on a relevance feedback.
(3) A refined or second search execution step for using the evaluation contents read by the evaluation content read step and performing a re-retrieval using the relevance feedback according to a predetermined method.
(4) A refined search information storage step for storing a retrieved result and a query after the refined search using the relevance feedback.
(5) A second retrieved result output step for outputting a retrieved result from the search performed at the refined or second execution step.
(6) A quit or end-search criterion calculation step for comparing retrieval information stored at the unrefined information storage step with refined information stored at the storage step according to a predetermined method to calculate a criterion value (used in determining whether or not to end the search process.
(7) A quit criterion output step for outputting the quit criterion calculated at the quit criterion calculation step.

One embodiment of the present invention relates to a method for retrieving information from a computer system including a user terminal and a storage area is disclosed. The method includes retrieving first information from the storage area using a first search query. The first search query has a first element and a first weight that is associated with the first element. The first search query has been formulated to retrieve target information. The first information includes at least a first data block. Second information is retrieved from the storage area using a second search query. The second search query has the first element and a second weight that is associated with the first element. The second search query is derived from a relevance feedback provided on the first data block of the first information.

An end-search criterion is provided to the user terminal. The end-search criterion provides information as to whether or not to end a first retrieval procedure for the target information. The first retrieval procedure is associated with a search query having the first element.

In addition, the first retrieval procedure is terminated based on information provided by the end-search criterion. A second retrieval procedure is initiated using a third search query having a second element that is not included in the first or second search query.

In one embodiment, a method for retrieving information from a computer system including a user terminal and a storage area, includes retrieving first information from the storage area using a first search query, the first search query having a first element and a first weight that is associated with the first element. The first search query has been formulated to retrieve target information. The first information includes at least a first data block. Second information is retrieved from the storage area using a second search query. The second search query has the first element, and a second weight that is associated with the first element. The second search query is derived from a relevance feedback provided on the first data block of the first information. An end-search criterion is provided to the user terminal. The end-search criterion provides information as to whether or not to end a first retrieval procedure for the target information. The first retrieval procedure is a search procedure using a search query having the first element.

In another embodiment, a method for retrieving information provided within a computer system, the computer system including a user terminal and a storage system including a storage area, includes retrieving first information from the storage area using a first query vector, the first query vector having first and second characteristics and first and second weights, the first and second characteristics being associated with the first and second weights, respectively, the first query vector having been formulated to retrieve target information, the first information including at least a first block; providing the first information to the user terminal; receiving a relevance feedback on the first data block of the first information from the user terminal; retrieving second information from the storage area using a second query vector, the second query vector having the first characteristic being associated with a third weight that is different from the first weight; and providing a quit criterion to the user terminal, the quit criterion providing information as to whether or not to end a first retrieval procedure for the target information.

In other embodiment, a method for retrieving information from a user terminal coupled to one or more storage areas of a computer system, comprises providing search criterion for target information desired by a user of the user terminal to an information retrieval device; receiving first information retrieved from a first storage area by the information retrieval device using a first search query that has been generated using the search criterion, the first search query having a first element and a first weight that is associated with the first element, the first search query having been formulated to retrieve target information, the first information including at least a first data block; providing a relevance feedback on the first data block of the first information to the information retrieval device; receiving second information retrieved from a second storage area by the information retrieval device using a second search query, the second search query having the first element and a second weight that is associated with the first element, the second search query being derived from the relevance feedback; and receiving an end-search criterion to the user terminal, the end-search criterion providing information as to whether or not to terminate a first retrieval procedure for the target information, the first retrieval procedure being associated with a search query having the first element.

In another embodiment, a method for retrieving information from a computer system including a user terminal and a storage area, comprises retrieving first information from the storage area using a first search query, the first search query having been formulated to retrieve target information, the first information including at least a first data block; retrieving second information from the storage area using a second search query, the second search query being different than the first search query, the second search query being derived from a relevance feedback provided on the first data block of the first information; and providing an end-search criterion to the user terminal, the end-search criterion providing information as to whether or not to end a first retrieval procedure for the target information.

In another embodiment, a computer readable medium for retrieving information from a computer system including a user terminal and a storage area, comprises code for retrieving first information from the storage area using a first search query, the first search query having a first element and a first weight that is associated with the first element, the first search query having been formulated to retrieve target information, the first information including at least a first data block; code for retrieving second information from the storage area using a second search query, the second search query having the first element and a second weight that is associated with the first element, the second search query being derived from a relevance feedback provided on the first data block of the first information; and code for providing an end-search criterion to the user terminal, the end-search criterion providing information as to whether or not to end a first retrieval procedure for the target information, the first retrieval procedure being associated with a search query having the first element.

In yet another embodiment, an information retrieval system includes a user terminal to initiate a search for target information; a storage area to store information; an information retrieval device configured to communicate with the user terminal and execute an information search request from the user terminal; a communication link coupling the storage area and the information retrieval device; and a computer readable medium. The medium includes code for retrieving first information from the storage area using a first search query, the first search query having a first element and a first weight that is associated with the first element, the first search query having been formulated to retrieve target information, the first information including at least a first data block; code for retrieving second information from the storage area using a second search query, the second search query having the first element and a second weight that is associated with the first element, the second search query being derived from a relevance feedback provided on the first data block of the first information; and code for providing an end-search criterion to the user terminal, the end-search criterion providing information as to whether or not to end a first retrieval procedure for the target information, the first retrieval procedure being associated with a search query having the first element.

As used herein, the terms "refined" and "unrefined" are relative terms. Accordingly, an unrefined search merely means that it used a search query that has been modified by a subsequent search (refined search). That is, the unrefined search itself may a refined search with respect to another search.

As used herein, the term "data block" refers to data that provides cohesive information and may be stored together as a file in one or more storage areas or in one or more storage devices, and so on. Examples of a data block is an image data of a given object, an audio file, a PDF file, a word processing file, and a Webpage.

As used herein, the term "information retrieval device" refers any component, device, object, module, apparatus, system, subsystem, or software that is configured to respond to a search request that has been received. Examples of the information retrieval device are a personal computer, a microprocessor, a server, and a search engine.

DETAILED DESCRIPTION OF THE INVENTION

Figure 1:
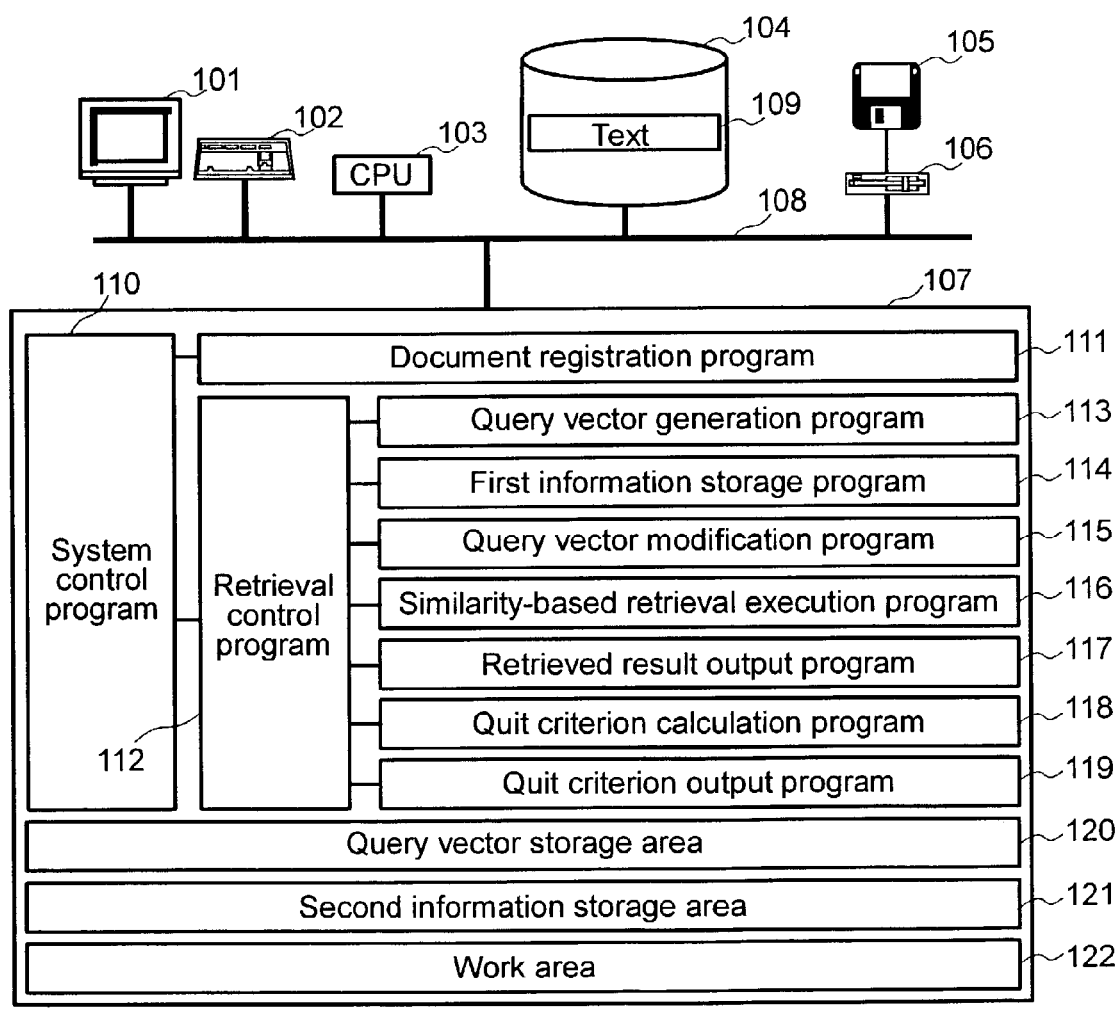
FIG. 1 shows an overall configuration of a first embodiment of a document retrieval system according to the present invention.
Figure 2:
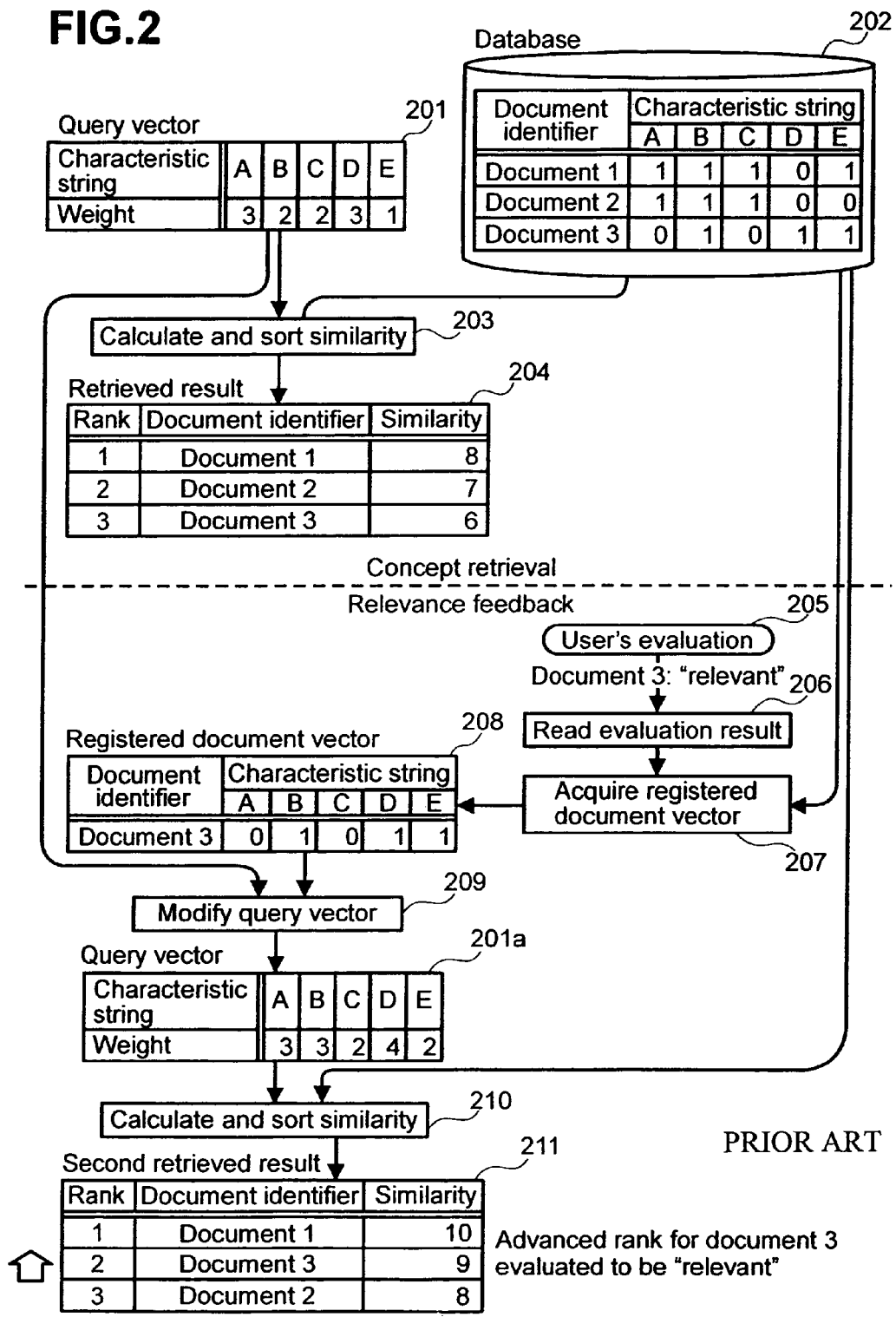
FIG. 2 shows an outline of relevant documents retrieval and relevance feedback processes according to a conventional search technique.

The configuration of the first embodiment according to the present invention will now be described with reference to FIG. 1.

The document retrieval system according to the present embodiment comprises a display 101 to display retrieved results; a keyboard 102 to enter registration and retrieval commands and an evaluation in response to retrieved results; a central processing unit (CPU) 103 to process the registration and retrieval; a magnetic disk apparatus 104 to store various data; a floppy disk drive (FDD) 106 to read various programs and data from a floppy disk 105; a main memory 107 to temporarily store registration and retrieval programs and data; and a bus 108 to couple these components with each other.

The magnetic disk apparatus 104 is one of secondary storage apparatuses and stores text 109. Information stored in the floppy disk 105 is read into the main memory 107 or the magnetic disk apparatus 104 via the FDD 106. It is also possible to store a program for executing the similarity-based retrieval method according to the present embodiment in the floppy disk 105 and read the program for execution.

The main memory 107 stores a system control program 110 for controlling the entire retrieval system, a document registration program 111 for registering documents to be retrieved, and a retrieval control program 112 for controlling retrieval processes.

The retrieval control program 112 comprises a query vector generation program 113 for generating a query vector at the first retrieval; a first information storage program 114 for maintaining the most recent retrieved result; a query vector modification program 115 for modifying the query vector based on an evaluation for the retrieved result; a similarity-based retrieval execution program 116 for executing the similarity-based retrieval using the query; a retrieved result output program 117 for outputting a result of the similarity-based retrieval; a quit criterion calculation program 118 for calculating a quit criterion using a search result; and a quit criterion output program 119 for outputting the calculated quit criterion.

There are provided a query vector storage area 120, a first information storage area 121, and a work area 122. The query vector storage area 120 stores a query vector, i.e., a set of a characteristic string used as a query for the similarity-based retrieval and a weight for the characteristic string. The first information storage area 121 stores the most recent retrieved result. The work area 122 stores other temporary data.

The embodiment uses the magnetic disk apparatus as a secondary storage apparatus. It may be preferable to use the other secondary storage apparatuses such as optical magnetic disk apparatuses or storage apparatuses connected via a network such as SAN (Storage Area Network).

The embodiment is configured to read information stored in the floppy disk 105 via FDD 106. It may be preferable to use the other storage media and corresponding readers such as a CD-ROM and a CD-ROM drive.

While the embodiment uses the keyboard as an input apparatus, it may be preferable to use a mouse, portable terminals such as a cellular phone and a PDA (Personal Digital Assistant), or other input apparatuses.

While the embodiment outputs information to the display, it may be preferable to output information to the other networked PCs' displays, transmit information as electronic mail, or use the other output apparatuses.

The following describes each program's procedure according to the present embodiment.

A procedure of the system control program 110 is described first. The system control program 110 checks a command entered from the keyboard 102. When a document registration command is entered, the system control program 110 starts the document registration program 111 to register a document. When a document retrieval command is entered, the system control program 110 starts the retrieval control program 112 to retrieve documents.

The following describes a procedure of the document registration program 111 activated by the system control program 110. The document registration program 111 assigns "document identifiers" to the retrieval-oriented documents stored in the floppy disk 105, and then stores these documents as the text 109 in the magnetic disk apparatus 104. The document identifier is any identifier that can uniquely identify a corresponding retrieval-oriented document.

Figure 4:
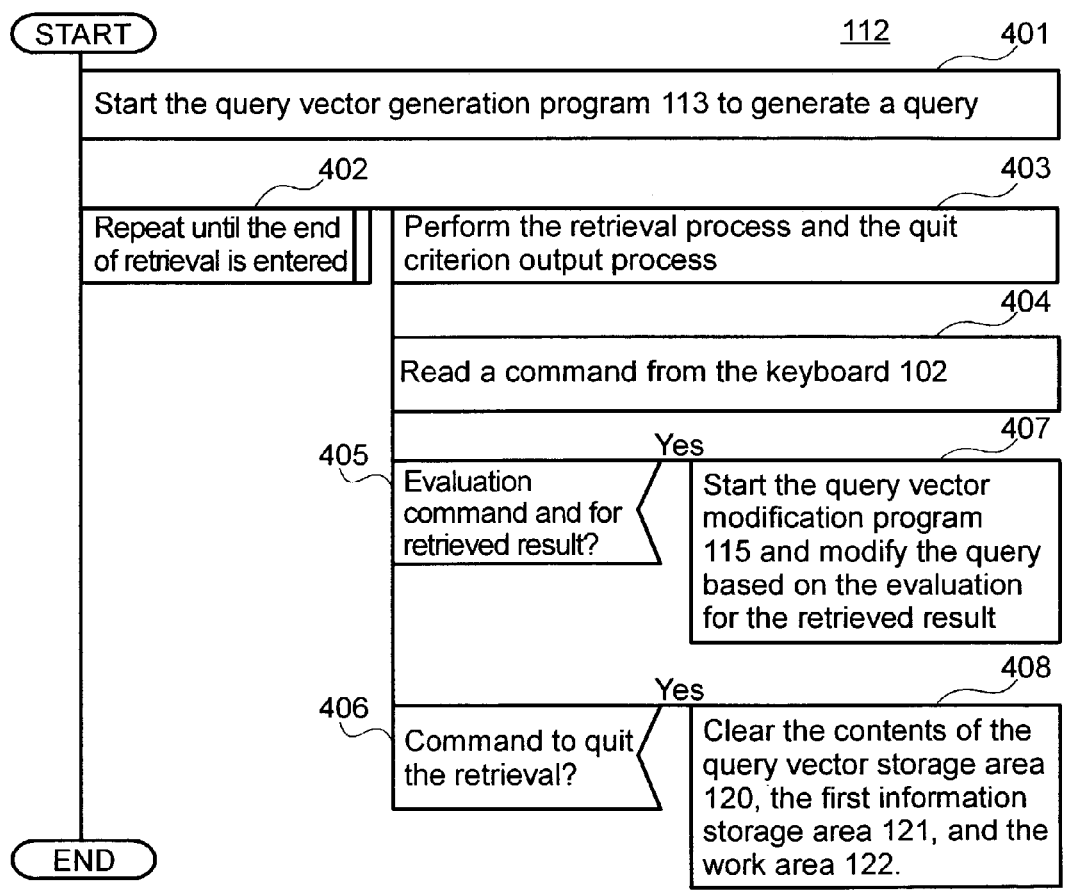
FIG. 4 is a PAD showing a procedure of a retrieval control program according to the first embodiment of the present invention.

The following describes a procedure of the retrieval control program 112 activated by the system control program 110 with reference to a PAD (Problem Analysis Diagram) in FIG. 4.

At step 401, the retrieval control program 112 activates the query vector generation program 113 to generate a query vector, and then stores the query vector in the query vector storage area 120.

At step 402, processes from steps 403 to 408 are repeated until a command to end the retrieval is entered from the keyboard 102.

At step 403, the first information storage program 114 is activated to store a retrieved result before performing a second, refined retrieval based on the relevance feedback in the first information storage area 121. Then, the similarity-based retrieval execution program 116 is activated to perform a similarity-based retrieval using a query vector stored in the query vector storage area 120. Then, the retrieved result output program 117 is activated to output a result of the similarity-based retrieval performed by the similarity-based retrieval execution program 116 to the display 101. Then, the quit criterion calculation program 118 is activated to calculate a quit criterion as a criterion to quit the relevance feedback. Then, the quit criterion output program 119 is activated to output the quit criterion calculated by the quit criterion calculation program 118.

At step 404, the retrieval control program 112 reads a command entered from the keyboard 102.

At step 405, the retrieval control program 112 checks the command entered at step 404. If the command is to evaluate whether the user considers "relevant" or "not relevant" the documents contained in the retrieved result of the similarity-based retrieval output to the display 101 by the retrieved result output program 117, the query vector modification program 115 is activated at step 407 to modify the query vector based on the evaluation command.

At step 406, the retrieval control program 112 checks the command entered at step 404. If the command is to quit the retrieval, the retrieval control program 112 clears the contents of the query vector storage area 120, the first information storage area 121, and the work area 122 at step 408.

The embodiment is configured to enter the command to evaluate whether a document is "relevant" or "not relevant". As disclosed in JP-A No. 22787/2001, however, it may be preferable to enter a command simply evaluating that a document is "relevant". Alternatively, it may be also preferable to evaluate otherwise such as entering a degree of relevance.

The following describes a procedure of the query vector generation program 113 activated by the retrieval control program 112. The conventional technique discloses the method of generating a query. The description below shows the query generation process disclosed in the prior art as an example to describe the procedure of the query vector generation program 113.

The query vector generation program 113 reads a so-called query document into the work area 122 and extracts a characteristic string from the read query document. Here, the query document signifies a document that is entered from the keyboard 102 as a query for the similarity-based retrieval. The query vector generation program 113 counts the term frequency in the query document with respect to the extracted characteristic string. The query vector generation program 113 stores a set of the characteristic string and the term frequency as a query vector in the query vector storage area 120. The query vector is used for processes of the similarity-based retrieval execution program 116 to be described later.

The methods of extracting a characteristic string may include those based on the morphological analysis as disclosed in JP-A No. 301722/1994, those using the n-gram technique as disclosed in JP-A No. 231563/2000, or any other applicable methods.

The embodiment does not limit the number of types of characteristic strings extracted from query documents. To save the memory usage, it may be preferable to limit the number of types of these characteristic strings.

Figure 5:
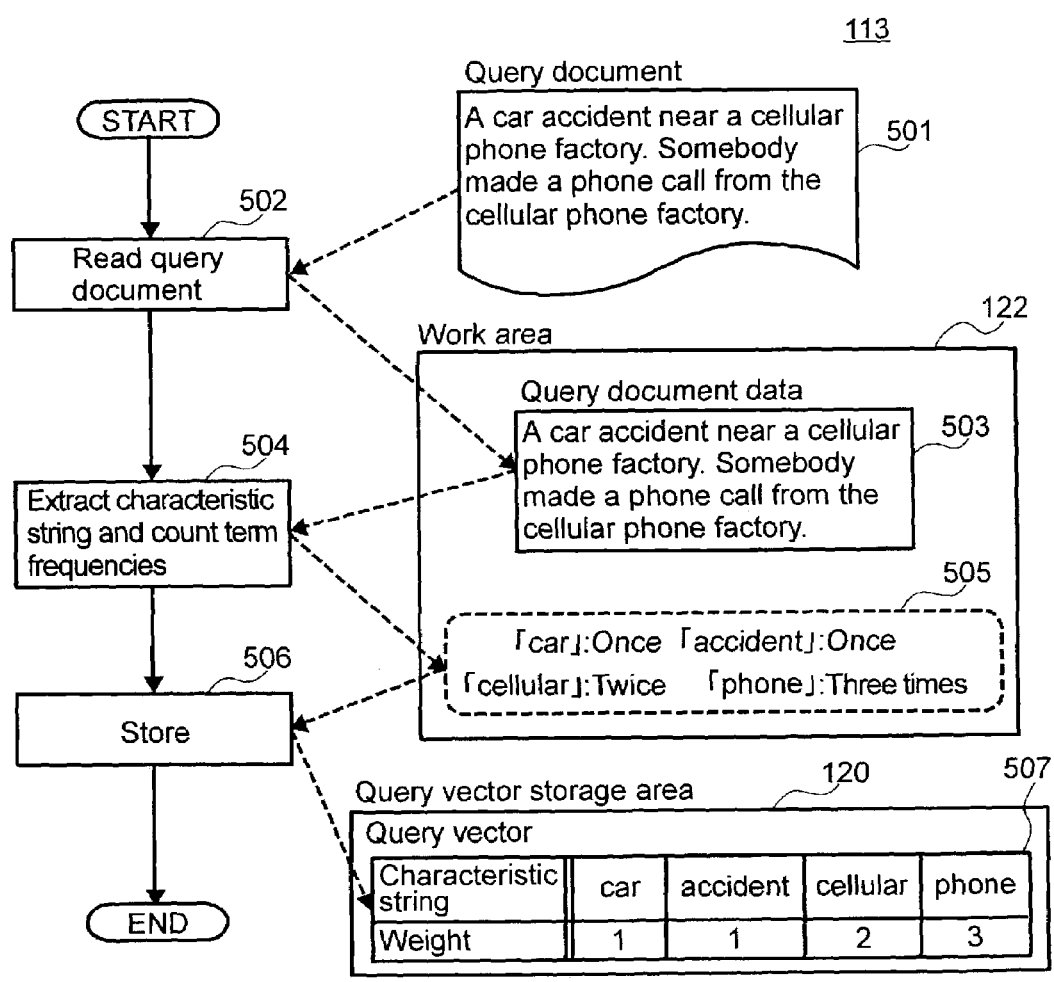
FIG. 5 shows a procedure of generating a query vector according to the first embodiment of the present invention.

With reference to FIG. 5, the following specifically describes how the query vector generation program 113 generates a query vector.

First, a query document read process 502 reads a query document 501 into the work area 122. The query document 501 is stored as query document data 503.

Then, a characteristic string extraction and term frequency count process 504 extracts characteristic strings from the query document data 503 read by the query document read process 502. In this example, it is assumed to extract such characteristic strings as "car", "accident", "cellular", and "phone" according to a predetermined procedure. These search terms are also refers as "elements" or "characteristics" of a search query or query vector.

After the characteristic strings are extracted, the process 504 counts term frequencies of the characteristic strings in the query document data 503, producing sets of characteristic strings and term frequencies 505 in such a manner as once for "car", once for "accident", twice for "cellular", and three times for "phone". The sets are then stored in the work area 122.

Lastly, a storage process 506 stores the sets of characteristic strings and term frequencies 505 as a query vector 507 in the query vector storage area 120. The set is already obtained by the characteristic string extraction and term frequency count process 504

The following describes a procedure of the first information storage program 114 activated by the retrieval control program 112. First, the first information storage program 114 clears the contents of the first information storage area 121. Then, the first information storage program 114 stores sets of retrieval-oriented document ranks and document identifiers as a retrieved result before performing a second retrieval according to the relevance feedback derived from the first information storage area 121. The sets of retrieval-oriented document ranks and document identifiers are included in the most recent retrieved result stored in the work area 122 during a process of the similarity-based retrieval execution program 116 to be described.

While the embodiment clears the contents of the first information storage area 121, the contents thereof may maintained therein to generate a history. The embodiment stores the sets of ranks and document identifiers for all documents. To save the memory usage, it may be preferable to limit the number of sets of ranks and document identifiers for documents to be stored.

The following describes the query vector modification program 115 activated by the retrieval control program 112. The query vector modification program 115 modifies a query vector stored in the query vector storage area 120 based on a user's evaluation. The following describes a procedure of the similarity-based retrieval execution program 116 activated by the retrieval control program 112. First, the similarity-based retrieval execution program 116 uses the similarity equation Eq. 1 to calculate similarities between query vectors in the query vector storage area 120 and registered document vectors generated from the retrieval-oriented documents stored in the text 109. After sorting document identifiers of the retrieval-oriented documents in descending order of the similarities, the similarity-based retrieval execution program 116 stores the sets of the document identifiers and ranks as a retrieved result in the work area 122.

While the embodiment does not limit the number of retrieved results to be stored, the number thereof may be limited in order to save the memory usage. The embodiment stores sets of ranks and document identifiers as a retrieved result. Further, the retrieved result may be stored together with the other information such as similarities.

While the embodiment uses the work area 122 to store a set of ranks and document identifier, the magnetic disk apparatus 104 may be used as a temporary storage. While the embodiment uses the above-mentioned Eq. 1 to calculate similarities, the other similarity equations may be used.

The following describes a procedure of the retrieved result output program 117 activated by the retrieval control program 112. The retrieved result output program 117 displays a set of retrieval-oriented document ranks and document identifiers on the display 101. The similarity-based retrieval execution program 116 already stores that set in the work area 122. While the embodiment outputs a retrieved result on the display 101, the retrieved result may be output to the magnetic disk apparatus 104 and be used for the other processes.

Figure 6:
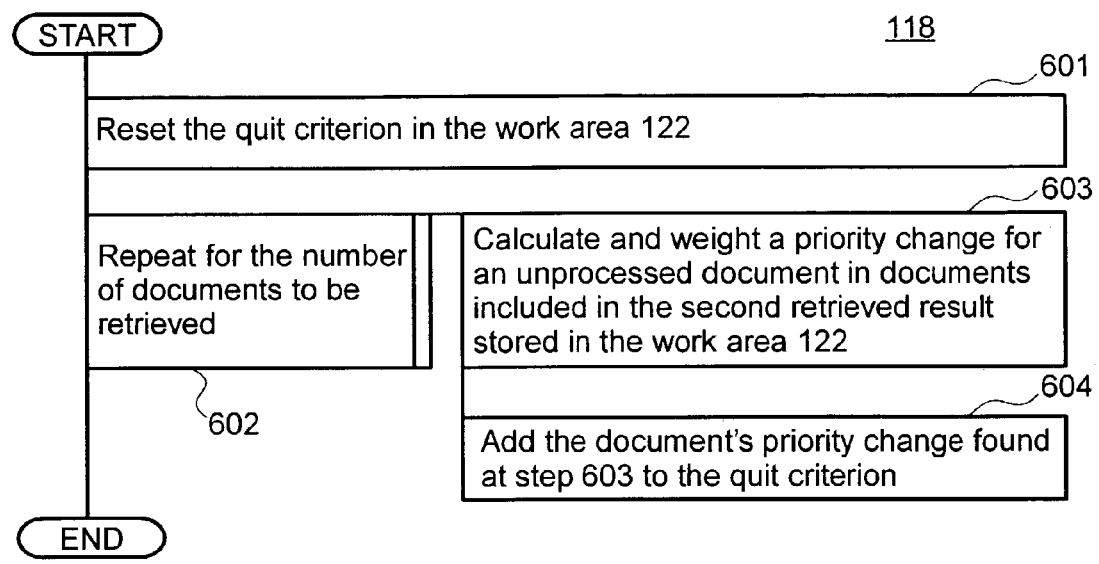
FIG. 6 is a PAD showing a procedure of a quit criterion calculation program according to the first embodiment of the present invention.

Then, the PAD in FIG. 6 is used to describe a procedure of the retrieved result used quit criterion calculation program 118 activated by the retrieval control program 112.

At step 601, the retrieved result used quit criterion calculation program 118 resets the quit criterion stored in the work area 122. At step 602, the program 118 repeats processes at steps 603 and 604 for the number of documents stored in the first information storage area 121.

At step 603, the retrieved result used quit criterion calculation program 118 calculates and weights rank changes of unprocessed documents contained in the second retrieved result stored in the work area 122. That is, the program 118 selects one set of the rank and the document identifier for an unprocessed document contained in the second retrieved result stored in the work area 122 by the similarity-based retrieval execution program 116. The program 118 then references the rank of a document corresponding to the selected document identifier out of documents contained in the retrieved result before the second retrieval. It should be noted that the first information storage program 114 already stores that retrieved result in the first information storage area 121. The program 118 then subtracts the rank of the retrieval-oriented document in the second retrieved result from the rank thereof in the retrieved result before the second retrieval. The program 118 then divides a difference between the calculated ranks by the rank of the retrieval-oriented document in the second retrieved result.

Lastly, at step 604, the program 118 adds the rank change calculated at step 603 to the quit criterion.

Equation 3 expresses the quit criterion calculated from the process in FIG. 6. In this equation, M is the number of first or unrefined information items stored, R(D) the rank of document D in the previous retrieved result, and R'(D) the rank of document D in the second retrieved result.

$$\text{Quit criterion} = \sum_{D}^{M} \frac{R(D) - R'(D)}{R'(D)} \qquad \text{Eq. 3}$$

The larger the rank change a retrieved result produces, the larger quit criterion value Eq. 3 yields. When no rank change occurs in the retrieved result, the quit criterion becomes 0.

While the embodiment stores the quit criterion in the work area 122, the quit criterion may be stored otherwise such as output to the magnetic disk apparatus 104. While the embodiment uses Eq. 3 to calculate the quit criterion, it may be preferable to use an absolute value for a difference between ranks or other equations. While the embodiment calculates the quit criterion from a difference between ranks, it may be preferable to calculate the quit criterion from a difference between similarities.

Figure 3:
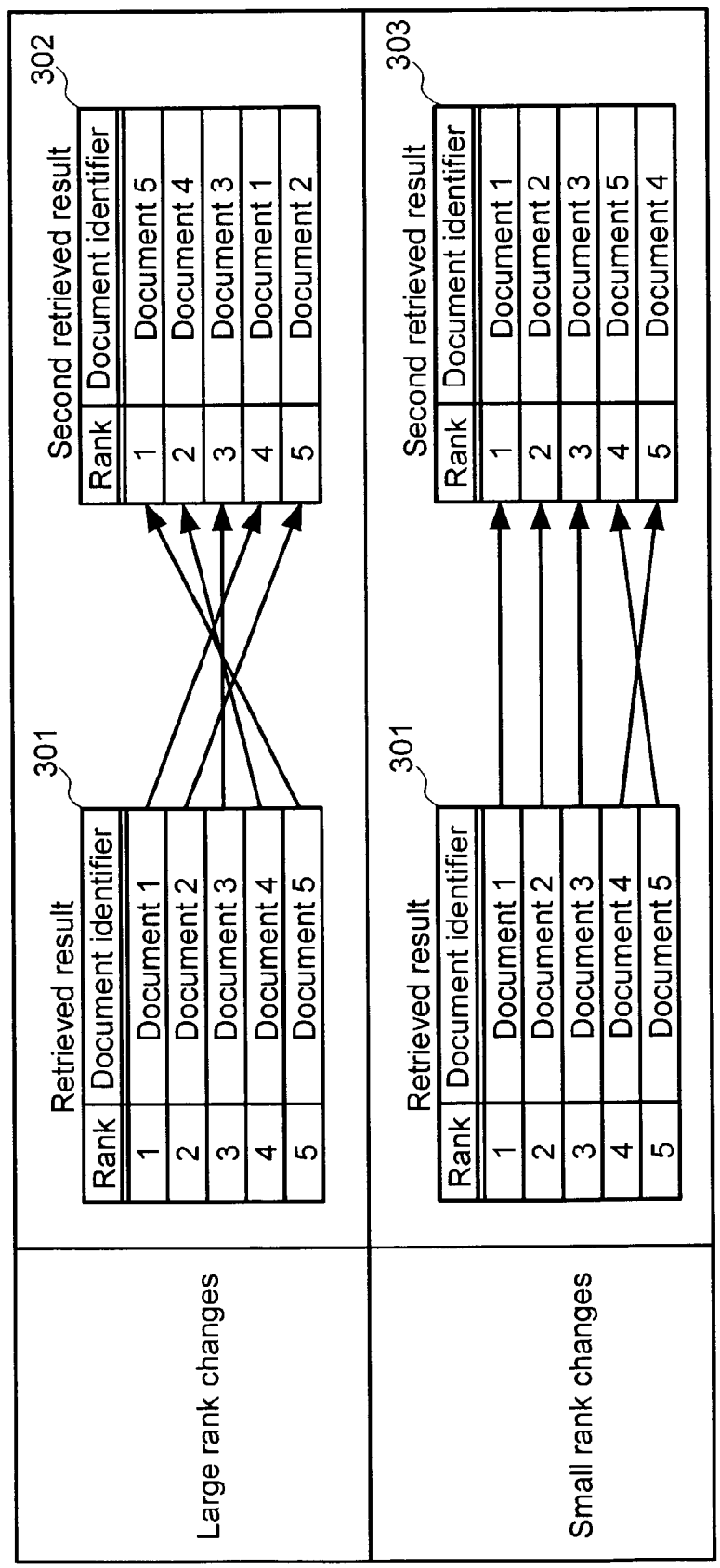
FIG. 3 shows examples of large rank changes and small rank changes due to a relevance feedback.

With reference to FIG. 3, the following specifically describes processes of the retrieved result used quit criterion calculation program 118.

In FIG. 3, a second retrieval is performed by evaluating document 5 at the fifth rank to be "relevant" in the retrieved result 301. In the upper example, the second retrieved result 302 shows the ranks remarkably changed from the retrieved result 301. In this case, calculating the quit criterion using Eq. 3 (quit criterion calculation equation) yields quit criterion 3.65, as shown in Eq. 4.

$$\text{Quit criterion} = \frac{5-1}{1} + \frac{4-2}{2} + \frac{3-3}{3} + \frac{1-4}{4} + \frac{2-5}{5} = 3.65 \qquad \text{Eq. 4}$$

In the lower example, the second retrieved result 303 shows the ranks changed only slightly from the retrieved result 301 after the second retrieval. In this case, calculating the quit criterion yields quit criterion 0.05, as shown in Eq. 5.

$$\text{Quit criterion} = \frac{1-1}{1} + \frac{2-2}{2} + \frac{3-3}{3} + \frac{5-4}{4} + \frac{4-5}{5} = 0.05 \qquad \text{Eq. 5}$$

Consequently, referencing quit criterions can determine a degree of rank changes.

The following describes a procedure of the quit criterion output program 119 activated by the retrieval control program 112. When the retrieved result used quit criterion calculation program 118 stores a quit criterion in the work area 122, the quit criterion output program 119 displays the quit criterion on the display 101.

Figure 7:
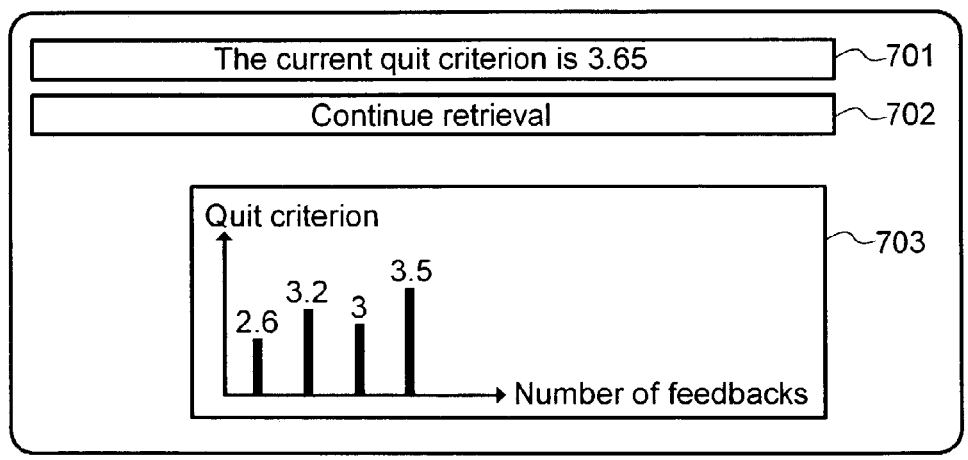
FIG. 7 shows a display example of the quit criterion according to the first embodiment of the present invention.

While the embodiment outputs the quit criterion as a numeric value on the display 101, the quit criterion may be displayed as a message 701, as shown in FIG. 7. It may be also preferable to display a message 702 corresponding to the quit criterion or a graph 703 as a history of quit criterions from the past. These pieces of information may be output simultaneously. While the example displays the quit criterion on the display 101, the quit criterion may be stored in the work area 122 or in the magnetic disk apparatus 104 to be used for the other processes. It may be preferable to enable or disable a user interface for specifying a retrieval according to the quit criterion.

Figure 8:
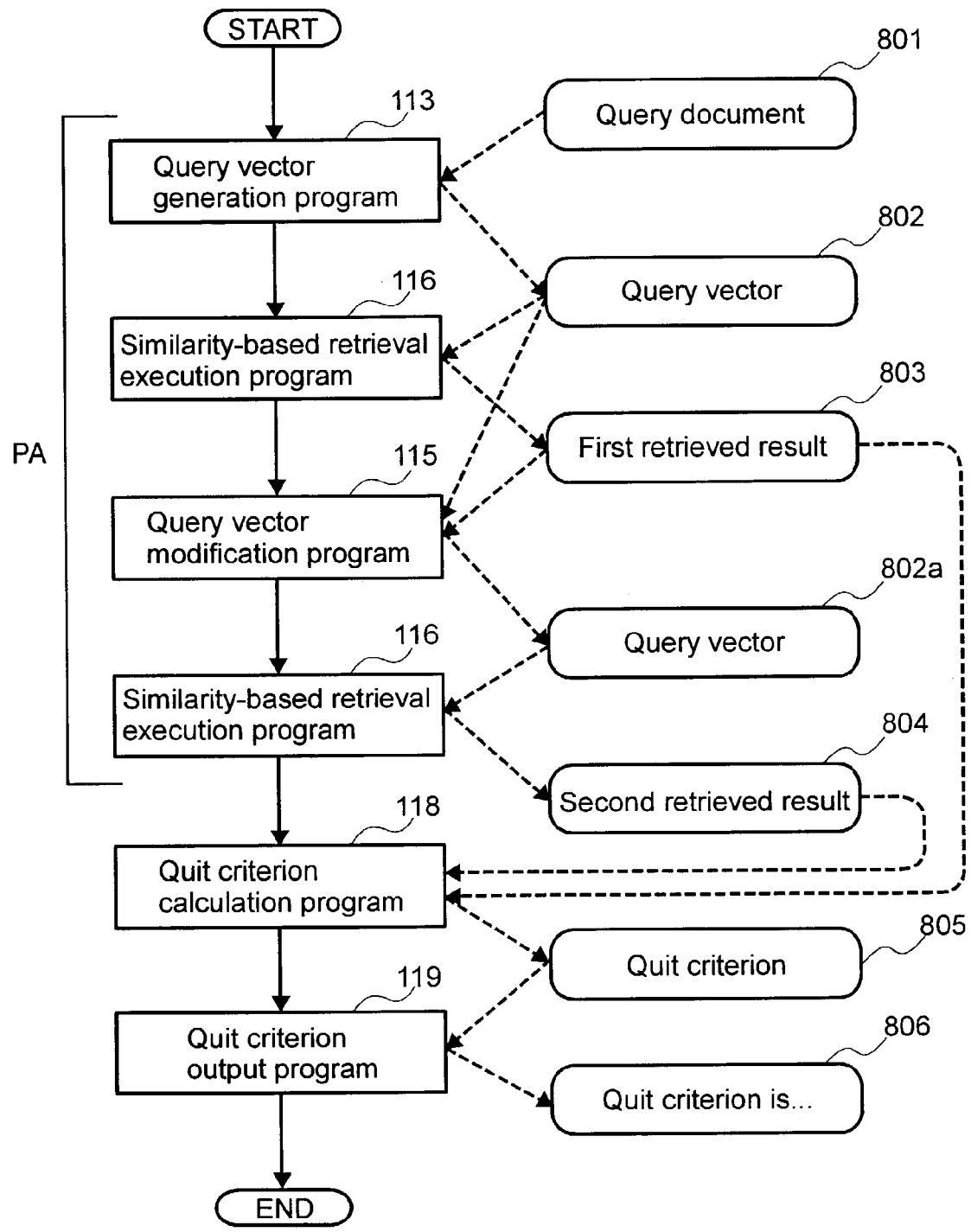
FIG. 8 is a process flowchart according to the first embodiment of the present invention.

Referring now to FIG. 8, there is illustrated a process flow of the embodiment.

First, a query document 801 is entered. The query vector generation program 113 generates a query vector 802.

Then, the similarity-based retrieval execution program 116 executes a similarity-based retrieval to output a retrieved result 803.

A user evaluates whether " the first retrieved result 803 is "relevant" or "not relevant." Based on the user's evaluation, the query vector modification program 115 modifies the query vector 802 to a query vector 802a.

The similarity-based retrieval execution program 116 re-executes the similarity-based retrieval to output a second retrieved result 804.

Then, the quit criterion calculation program 118 calculates a quit criterion 805 from the first retrieved result 803 and the second retrieved result 804.

Lastly, the quit criterion output program 119 outputs the quit criterion 805 as a message 806.

While the present embodiment is directed to retrieving documents, other embodiments may be directed to retrieving images having color information or the like as a desired characteristic, or retrieving any other electronic data. Since the embodiment extracts a characteristic string from the text whenever necessary, this may decrease a retrieval speed in large-scale databases. In this case, as disclosed in JP-A No. 309078/1997, the magnetic disk apparatus 104 stores term frequencies of characteristic strings in advance when documents are registered. The retrieval is configured to reference associated files for a fast similarity-based retrieval. Indexing associated files can provide a faster retrieval.

As mentioned above, the embodiment makes it possible to easily determine when to quit the retrieval process by checking the quit criterions.

The second embodiment will now be described. When the relevance feedback is used for a retrieval, a retrieved result may contain documents having vectors similar to the query vector. When a user evaluates such documents, a little change may be found in the query vector directions according to the evaluation, and the second retrieved result may show no change in the ranks. In this case, the quit criterion becomes 0 according to the first embodiment. Accordingly, the user may end the retrieval process although there is a possibility of finding more relevant documents by evaluating the other documents and continuing the retrieval process.

Figure 9:
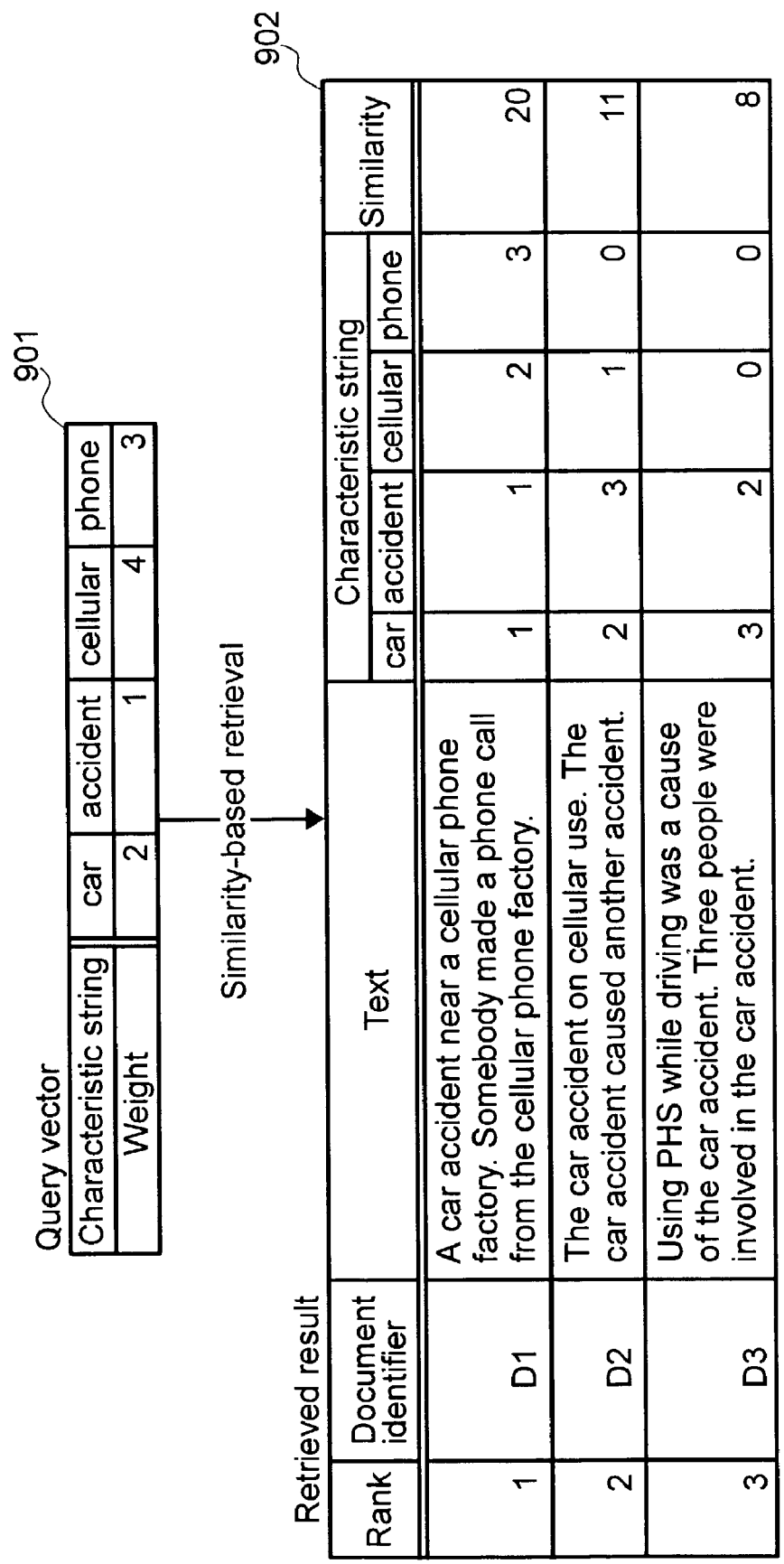
FIG. 9 shows an example of the relevant documents retrieval according to a second embodiment of the present invention.
Figure 10:
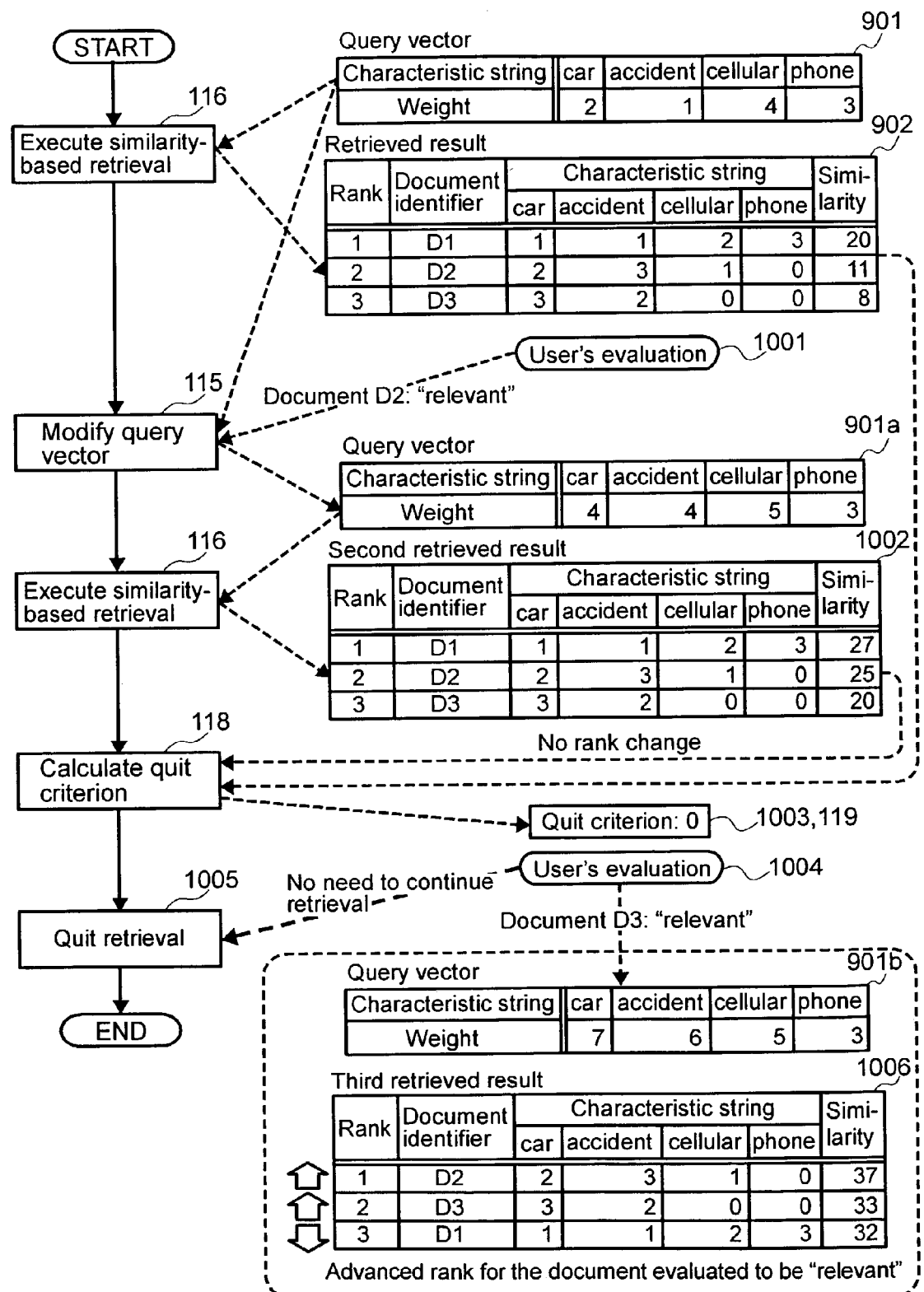
FIG. 10 shows an example of the relevance feedback according to the second embodiment of the present invention.

FIGS. 9 and 10 show illustrates some issues pertaining to the relevance feedback processes according to the first embodiment.

This example assumes that a query vector 901 in FIG. 9 is used to retrieve a retrieved result 902. A user intends to retrieve a document concerning "Car accident while using a cellular phone" and evaluates a document D2 in the retrieved result 902 to be "relevant".

The following describes the example of relevance feedback in FIG. 10. As disclosed in the conventional technique, the query vector modification process of this example assumes that the term frequency of characteristic strings contained in a document evaluated to be "relevant" is added to the weight of the query vector.

The similarity-based retrieval execution program 116 generates the retrieved result 902 based on the query vector 901. According to the retrieved result 902, the user evaluates the document D2 to be relevant (1001).

Based on the evaluation 1001, the query vector modification program 115 modifies the query vector 901 to a query vector 901*a*.

Based on the query vector 901*a*, the similarity-based retrieval execution program 116 retrieves a second retrieved result 1002 containing no rank changes for the retrieval-oriented documents.

The quit criterion calculation program 118 yields a quit criterion 1003 of 0, as indicated by Eq. 6.

$$\text{Quit criterion} = \frac{1-1}{1} + \frac{2-2}{2} + \frac{3-3}{3} = 0 \qquad \text{Eq. 6}$$

When the user evaluates another document D3 containing similar contents to be "relevant," the query vector 901*a* is further modified to a query vector 901*b*. Since the quit criterion 1003 is set to 0 at a user's evaluation 1004, the user specifies to quit the relevance feedback (1005) even if the document evaluated to be "relevant" may be ranked higher in a retrieved result 1006 (hereafter referred to as a third retrieved result) generated from the query vector 901*b*.

Figure 11:
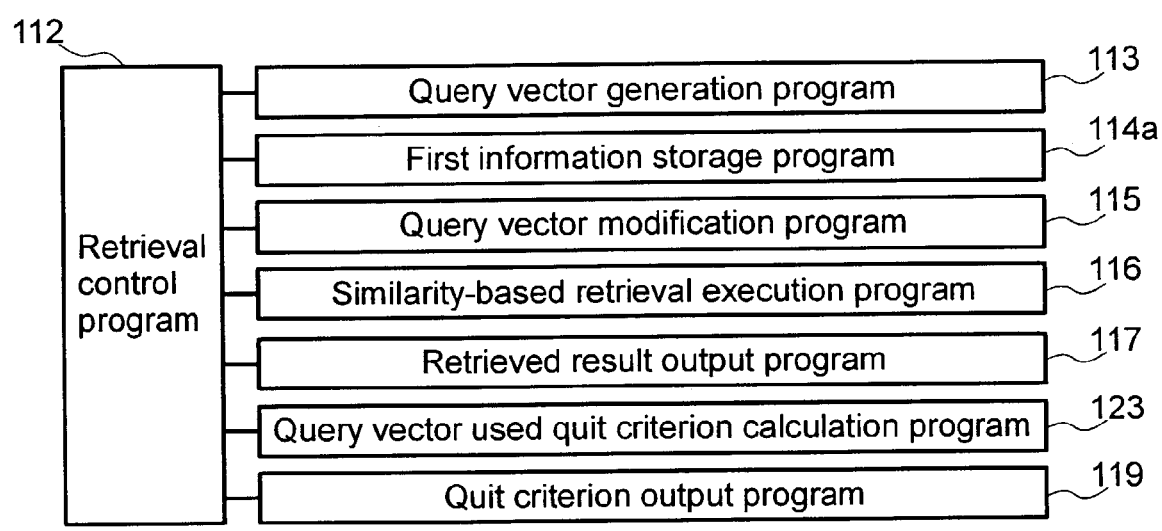
FIG. 11 shows a configuration of a retrieval subsystem according to the second embodiment of the present invention.

To address this issue, the second embodiment calculates a quit criterion from the query vector. Referring now to FIG. 11, there is illustrated a configuration of the second embodiment according to the present invention. The second embodiment uses a quit criterion calculation program 123 instead of the quit criterion calculation program 118. The calculation program 123 uses a query vector to calculate the quit criterion. The calculation program 118 uses the retrieved results to calculate the quit criterion. In addition, a first information storage program 114*a* differs from the first information storage program 114 in their procedures.

The following describes a procedure of the first information storage program 114*a*. The first information storage program 114*a* first clears the contents of the first information storage area 121. The program 114*a* then stores sets of characteristic strings and weights contained in the most recent query vector as a query vector - in the first information storage area 121 prior to the second retrieval. The most recent query vector is stored in the query vector storage area 120.

The following describes a procedure of the quit criterion calculation program 123.

The query vector used quit criterion calculation program 123 first reads the sets of characteristic strings and weights contained in the query vector before re-retrieval. The first information storage program 114*a* already stores this query vector in the first information storage area 121. The program 123 reads the sets of characteristic strings and weights contained in the query vector after the second retrieval. The query vector modification program 115 already stores this query vector in the query vector storage area 120. Lastly, the program 123 uses the quit criterion calculation equation Eq. 7 to calculate the quit criterion and store it in the work area 122.

$$\text{Quit criterion} = 1 - \frac{\sum_{i}^{T_1}\{w'(i) \times w(i)\}}{\sqrt{\sum_{i}^{T_2}\{w'(i)\}^2} \times \sqrt{\sum_{i}^{T_3}\{w(i)\}^2}} \qquad \text{Eq. 7}$$

where w'(i) is the weight for characteristic string i contained in the second query vector after the second retrieval, w(i) the weight for characteristic string i contained in the query vector before the second retrieval, T1 the number of characteristic string (the total number of different characteristic strings) matching between the query vectors before and after the second retrieval, T2 the number of characteristic string differences contained in the query vector after the second retrieval, and T3 the number of characteristic string differences contained in the query vector before the second retrieval.

Eq. 7 is used to calculate an inner product of query vectors before and after the re-retrieval. The quit criterion becomes 0 when execution of the query vector modification program 115 does not change the query vector direction.

An example of the embodiment will now be described with reference to FIG. 12. The example here assumes that the second retrieved result 1002 is obtained in the same manner as the process flow in FIG. 10. At this time, the query vector is modified from query vector 901 having weights (2,1,4,3) to the query vector 901*a* having weights (4,4,5,3).

Here, the quit criterion calculation program 123 calculates the quit criterion based on Eq. 7. The quit criterion 1201 is 0.078, as indicated by Eq. 8.

$$\text{Quit criterion} = 1 - \frac{2 \times 4 + 1 \times 4 + 4 \times 5 + 3 \times 3}{\sqrt{2^2 + 1^2 + 4^2 + 3^2} \times \sqrt{4^2 + 4^2 + 5^2 + 3^2}} = 0.078 \qquad \text{Eq. 8}$$

By referencing the quit criterion 1201, the user can continue the third retrieval if the second retrieved result 1002 shows no change in the ranks of the retrieval-oriented documents. In this example, the user evaluates the document D3 containing similar contents to be "relevant" at a user's evaluation 1202. The query vector modification program 115 further modifies the query vector 901*a* to the query vector 901*b*. The similarity-based retrieval execution program 116 performs a similarity-based retrieval based on the query vector 901*b* to generate a third retrieved result 1006 reflecting raised ranks for the documents evaluated to be "relevant".

While the embodiment is configured to use all the characteristic strings included in a query vector for calculating a quit criterion, the number of characteristic strings may be limited in order to save the memory usage. While the embodiment uses Eq. 7 as a quit criterion calculation equation, the other equations may be used.

According to the embodiment as mentioned above, a user can continue the retrieval by referencing quit criterions without making an incorrect judgment even if a re-retrieval shows no change in the ranks.

The third embodiment will now be described. In the relevance feedback retrieval method, each time a retrieval is conducted, weights for the query vector increases while weights for the registered document vector evaluated to be "relevant" remain unchanged. Accordingly, repeating a retrieval increases a weight difference between the registered document vector and the query vector.

If the weight difference increases, performing the relevance feedback does not change query vector directions significantly, causing a state of unchanged retrieved results (hereafter referred to as a "converged state").

When the converged state results, a user must quit the relevance feedback. When the retrieved result is unsatisfactory, it is necessary to retry the relevance feedback or reexamine the retrieval technique itself.

When the query vector shows no change according to the second embodiment, the user cannot determine whether to quit the retrieval because the converged state has been reached or to continue the retrieval by evaluating the other documents instead of evaluating the retrieval-oriented documents having similar query vectors.

To address this concern, the third embodiment calculates a quit criterion not after, but before the retrieval and provides the quit criterion to a user in advance.

Figure 13:
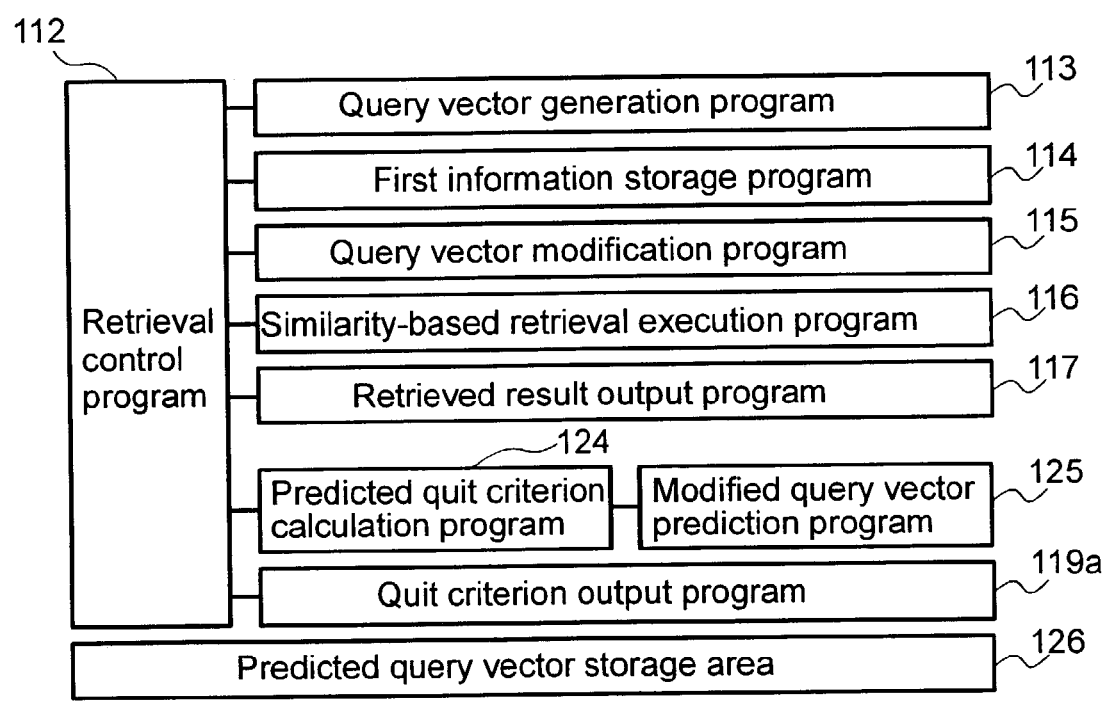
FIG. 13 shows a configuration of a retrieval subsystem according to a third embodiment of the present invention.

The embodiment configuration will be described with reference to FIG. 13. The retrieval process of the third embodiment is similar to the retrieval process of the first embodiment, as illustrated in FIG. 1, except that a prediction quit criterion program is executed at a quit criterion calculation step (i.e., at the step corresponding to the step 118). The third embodiment uses a predicted quit criterion calculation program 124, instead of the quit criterion calculation program 118. The retrieval process of the third embodiment uses a modified query vector prediction program 125, and a predicted query vector storage area 126. A quit criterion output program 119a of the third embodiment differs from the quit criterion output program 119 in their procedures.

Figure 14:
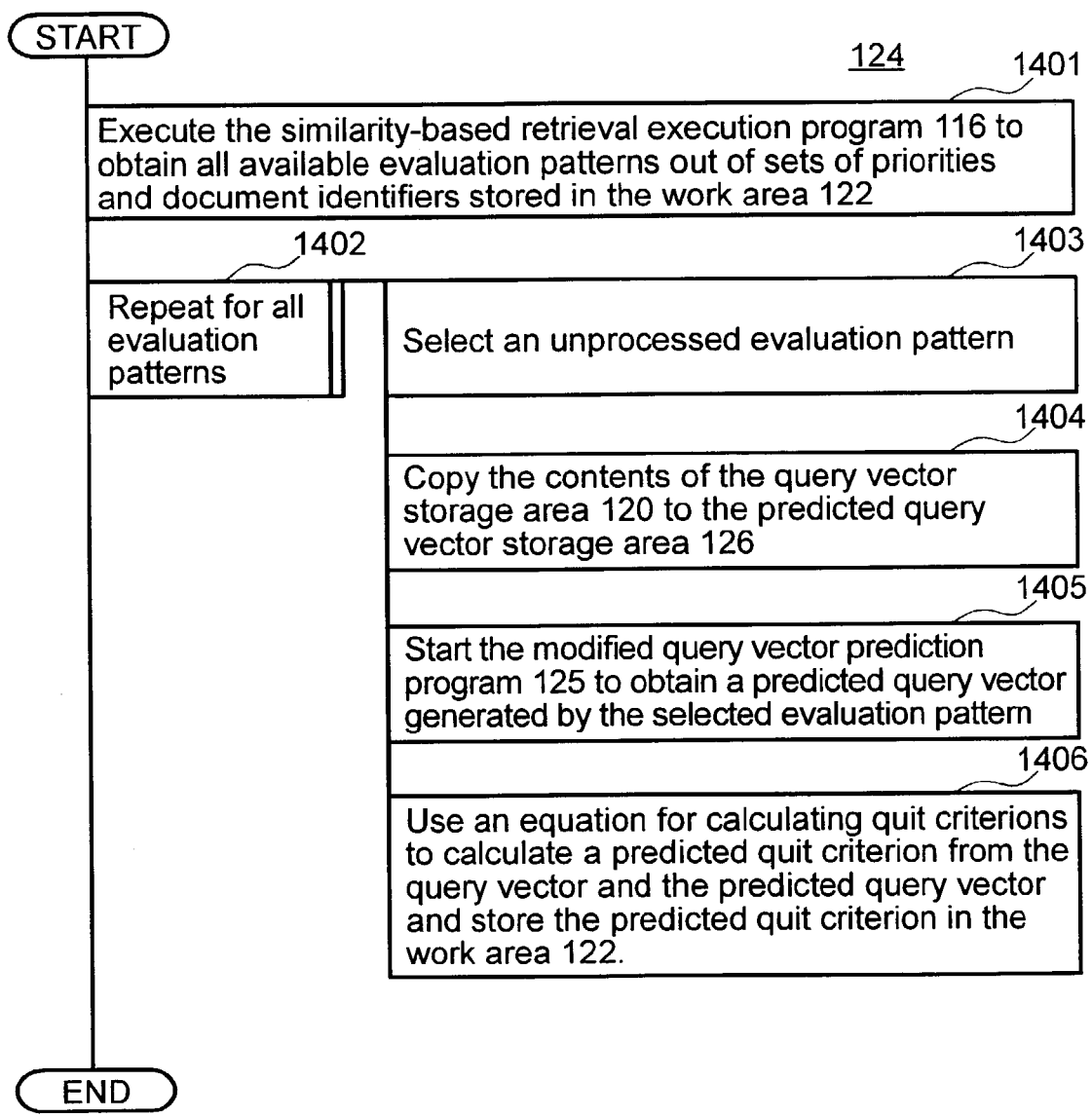
FIG. 14 is a PAD showing a procedure of a predicted quit criterion calculation program according to the third embodiment of the present invention.

Then, the PAD in FIG. 14 is used to describe a procedure of the predicted quit criterion calculation program 124. At step 1401, the program 124 obtains a combination of specifiable evaluation commands (hereafter referred to as an evaluation pattern) from sets of retrieval-oriented document ranks and document identifiers and stores the combination in the work area 122. The similarity-based retrieval execution program 116 already stores these sets in the work area 122.

Figure 15:
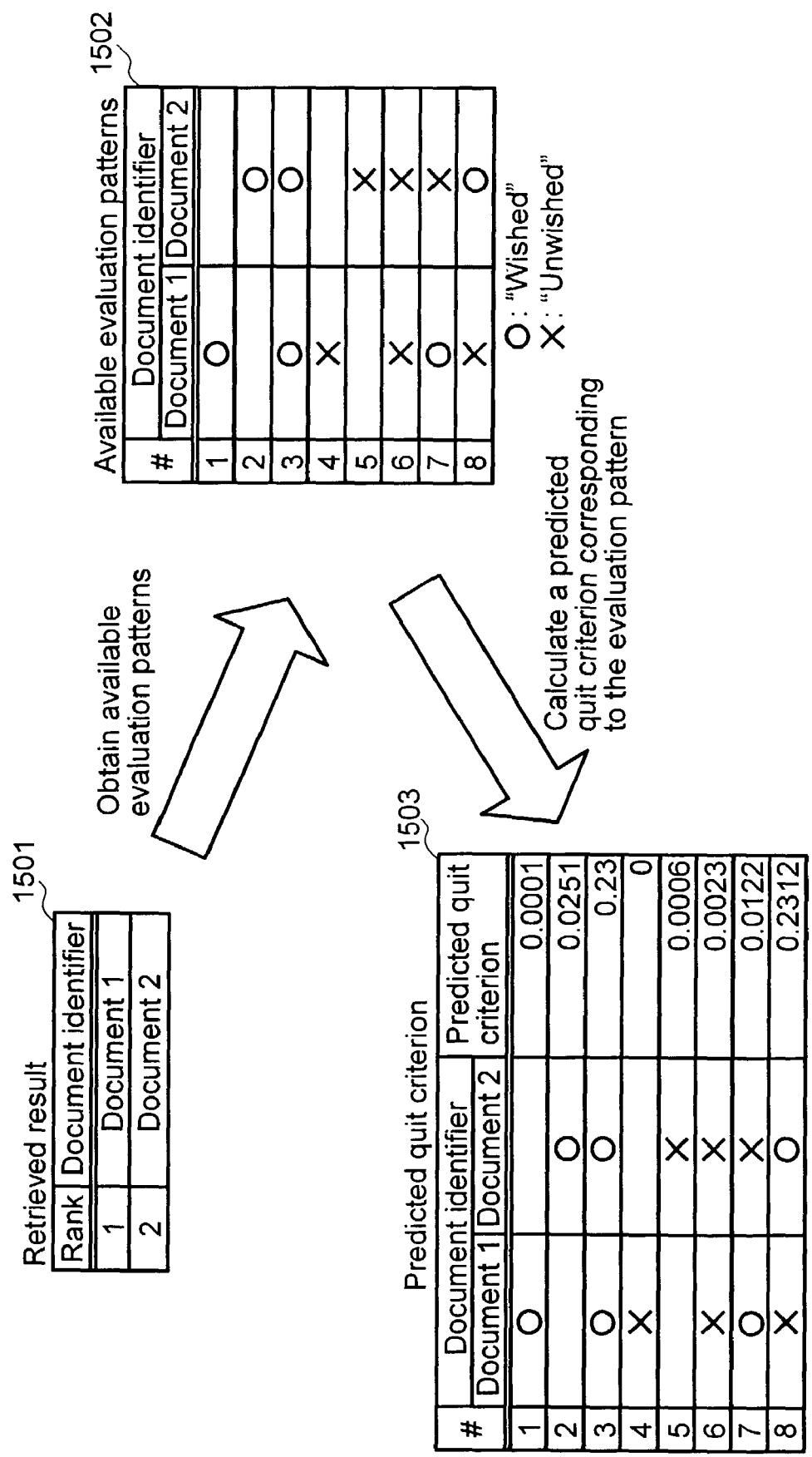
FIG. 15 shows a procedure of displaying a predicted quit criterion according to the third embodiment of the present invention.

An example of obtaining the evaluation pattern will be described with reference to FIG. 15. The example assumes that a retrieved result 1501 contains two documents. There are eight evaluation patterns 1502 in total when two evaluation commands for "relevant" and "not relevant" are specified or not for two documents in the retrieved result.

At step 1402, the predicted quit criterion calculation program 124 repeats processes from steps 1403 to 1406 for the number of evaluation patterns stored in the work area 122.

At step 1403, the program 124 selects one of unprocessed evaluation patterns. At step 1404, the program 124 copies the contents of the query vector storage area 120 to the predicted query vector storage area 126. These contents are modified by the query vector modification program 115.

At step 1405, the program 124 activates the modified query vector prediction program 125 to modify the query vector in the predicted query vector storage area 126 to a query vector (hereafter referred to as a "predicted query vector") expected to obtain if a second, refined retrieval is performed with the retrieval pattern specified.

Lastly, at step 1406, the program 124 uses Eq. 7 to calculate a quit criterion (hereafter referred to as a "predicted quit criterion") for the second retrieval based on the evaluation command, and stores this criterion in the work area 122. At this time, query vector w'(i) after the second retrieval in Eq. 7 is replaced by the predicated query vector in the predicted query vector storage area 126, and query vector w(i) before the second retrieval is replaced by the query vector in the query vector storage area 120.

The embodiment obtains combinations of all evaluation commands for a retrieved result. In order to save the memory usage, however, it may be preferable to limit the number of combinations by limiting the number of retrieval-oriented documents evaluated.

The following describes a procedure of the modified query vector prediction program 125 activated by the predicted quit criterion calculation program 124.

Figure 12:
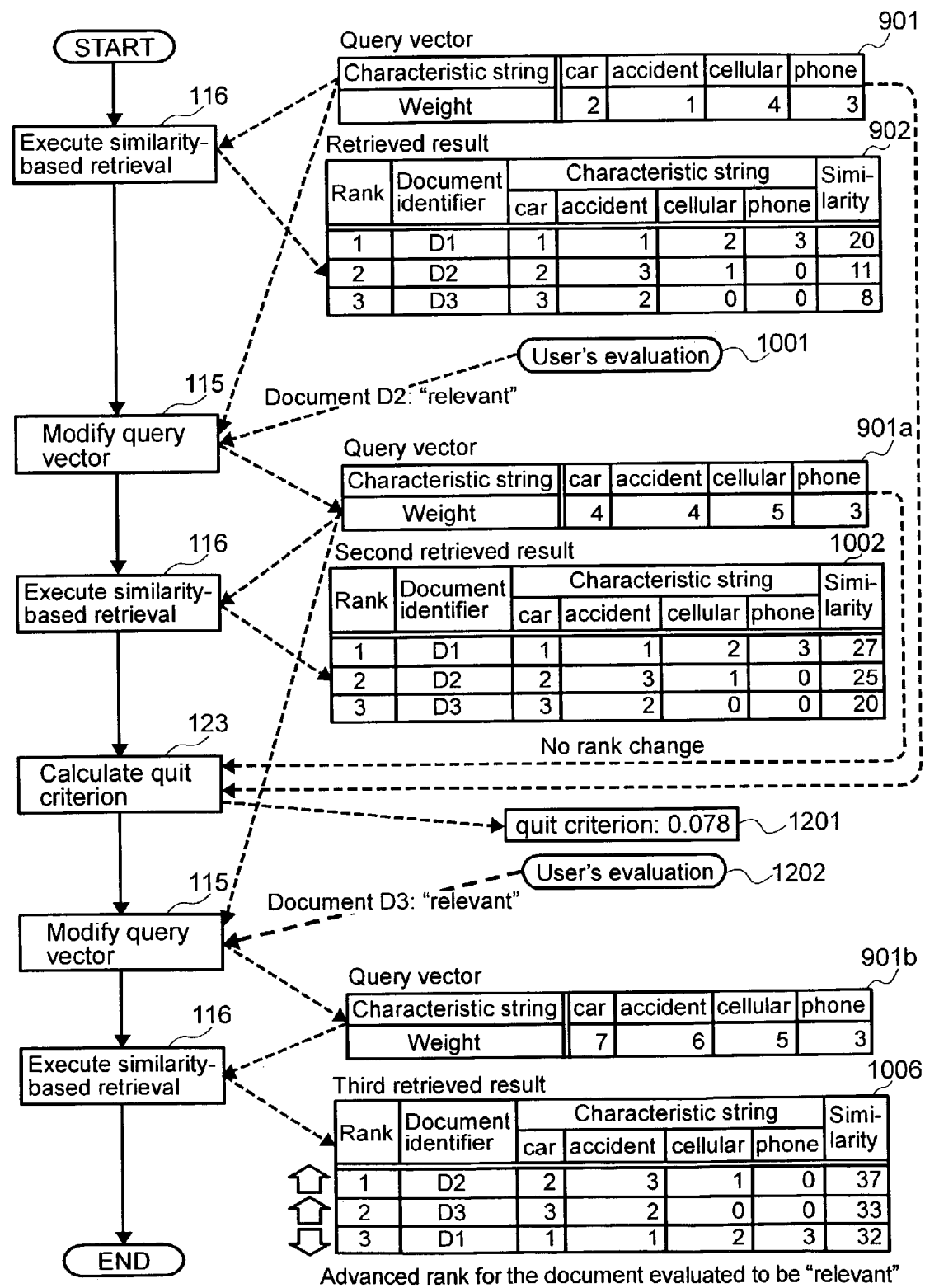
FIG. 12 shows an example of the relevance feedback according to the second embodiment of the present invention.

The modified query vector prediction program 125 modifies a query vector stored in the predicted query vector storage area 126 in the same manner as shown in FIG. 12 based on the evaluation pattern selected during execution of the predicted quit criterion calculation program 124 with reference to the predicted quit criterion.

The following describes a procedure of the quit criterion output program 119a. The quit criterion output program 119a displays predicted quit criterions stored in the work area 122 by the predicted quit criterion calculation program 124. As shown in FIG. 15, for example, the display 101 displays a table of predicted quit criterions 1503 corresponding to each evaluation pattern.

While the embodiment calculates predicted quit criterions from a query vector, they may be calculated from ranks of documents to be retrieved or from other information. While the embodiment outputs an individual predicted quit criterion for each evaluation pattern, an output may be configured as an average of predicted quit criterions or in any other form. While the embodiment is configured to output predicted quit criterions for all evaluation patterns, a predicted quit criterion may be output each time the evaluation command is entered.

The embodiment enables prediction of query vector changes due to a second retrieval before execution thereof. If no change is found in the retrieved result and the query vector, the user can know that he or she can continue the second retrieval by evaluating other documents without making an incorrect judgment.

According to the present invention, the user can efficiently judge whether or not to quit a retrieval in the relevance feedback by referencing the system-provided quit criterion and can perform the retrieval with reduced workload.

The foregoing invention has been described in terms of preferred embodiments. However, those skilled, in the art will recognize that many variations of such embodiments exist. Such variations are intended to be within the scope of the present invention and the appended claims.

The above detailed descriptions are provided to illustrate specific embodiments of the present invention and are not intended to be limiting. Numerous modifications and variations within the scope of the present invention are possible. Accordingly, the present invention is defined by the appended claims.

What is claimed is:

1. A method for retrieving information from a computer system including a user terminal and a storage area, the method comprising:
   retrieving first information from the storage area using a first search query, the first search query having a first element and a first weight that is associated with the first element, the first search query having been formulated to retrieve target information, the first information including at least a first data block;
   retrieving second information from the storage area using a second search query, the second search query having the first element and a second weight that is associated with the first element, the second search query being derived from a relevance feedback provided on the first data block of the first information; and
   providing an end-search criterion to the user terminal, the end-search criterion providing information as to whether or not to end a first retrieval procedure for the target information, the first retrieval procedure being a retrieval procedure using a search query having the first element,
   wherein the end-search criterion is derived by comparing first relevancy information relating to the first information and second relevancy information relating to the second information,
   wherein the first information includes the first data block and a second data block, each data block being provided with a first relevancy rank, wherein the second information includes the first data block and the second data block, each being provided with a second relevancy rank, the end-of-search criterion being derived based on an amount of change between the first relevancy rank and the second relevancy rank.

2. The method of claim 1, wherein the relevance feedback is provided by a user of the user terminal, the second search query being derived using the relevance feedback provided by the user.

3. The method of claim 1, further comprising:
   terminating the first retrieval procedure based on information provided by the end-search criterion; and
   initiating a second retrieval procedure using a third search query having a second element that is not included in the first or second search query.

4. The method of claim 1, wherein the end-search criterion is derived by comparing the first search query and the second search query.

5. The method of claim 1, wherein the first information includes the first data block and a second data block, the method further comprising:
   generating a plurality of relevancy patterns for the first and second data blocks; and
   providing a plurality of end-search criterion values for the plurality of relevancy patterns, thereby providing predicted end-search criterion values for the user to review.

6. The method of claim 1, wherein the target information includes one selected from a group consisting of: text data, image data, or audio data, or a combination thereof.

7. The method of claim 1, wherein the first and second search queries are vector queries having a plurality of elements and weights thereof.

8. A method for retrieving information from a computer system including a user terminal and a storage area, the method comprising:
   retrieving first information from the storage area using a first search query, the first search query having a first element and a first weight that is associated with the first element, the first search query having been formulated to retrieve target information, the first information including at least a first data block;
   retrieving second information from the storage area using a second search query, the second search query having the first element and a second weight that is associated with the first element, the second search query being derived from a relevance feedback provided on the first data block of the first information; and
   providing an end-search criterion to the user terminal, the end-search criterion providing information as to whether or not to end a first retrieval procedure for the target information, the first retrieval procedure being a retrieval procedure using a search query having the first element,
   wherein the end-search criterion is derived by comparing first relevancy information relating to the first information and second relevancy information relating to the second information,
   wherein the end-search criterion is derived from:

$$\text{Quit criterion} = \sum_{D}^{M} \frac{R(D) - R'(D)}{R'(D)}$$

where M is a number of the data blocks, R(D) is a rank of a data block D in a previously retrieved result, and R'(D) is a rank of the data block D in the second information.

9. A method for retrieving information provided within a computer system, the computer system including a user terminal and a storage system including a storage area, the method comprising:
   retrieving first information from the storage area using a first query vector, the first query vector having first and second characteristics and first and second weights, the first and second characteristics being associated with the first and second weights. respectively, the first query vector having been formulated to retrieve target information, the first information including at least a first block;
   providing the first information to the user terminal;
   receiving a relevance feedback on the first data block of the first information from the user terminal;
   retrieving second information from the storage area using a second query vector, the second query vector having the first characteristic being associated with a third weight that is different from the first weight; and
   providing a quit criterion to the user terminal, the quit criterion providing information as to whether or not to end a first retrieval procedure for the target information,
   wherein the quit criterion is derived by comparing first relevancy information relating to the first information and second relevancy information relating to the second information,
   wherein the first information includes the first data block and a second data block, each data block being provided with a first relevancy rank, wherein the second information includes the first data block and the second data block, each being provided with a second relevancy rank, the quit criterion being derived based on an amount of change between the first relevancy rank and the second relevancy rank.

10. The method of claim 9, further comprising:
generating the first query vector using a search criterion provided by the user terminal; and
retrieving third information from the storage area using a third query vector after providing the quite criterion to the user terminal,
wherein the storage area includes a plurality of storage devices.

11. The method of claim 9, wherein the quit criterion is derived by comparing the first query vector and the second query vector.

12. The method of claim 9, wherein the first information includes the first data block and a second data block, the method further comprising:
generating a plurality of relevancy patterns for the first and second data blocks; and
providing a quit criterion for each of the plurality of relevancy patterns, thereby providing predicted quit criterion values for the user to review.

13. A computer system including a user terminal and a storage area, the computer system comprising:
means for retrieving first information from the storage area using a first search query, the first search query having a first element and a first weight that is associated with the first element, the first search query having been formulated to retrieve target information, the first information including at least a first data block;
means for retrieving second information from the storage area using a second search query, the second search query having the first element and a second weight that is associated with the first element, the second search query being derived from a relevance feedback provided on the first data block of the first information; and
means for providing an end-search criterion to the user terminal, the end-search criterion providing information as to whether or not to end a first retrieval procedure for the target information, the first retrieval procedure being associated with a search query set including the first and second search queries, each having the first element,
wherein the end-search criterion is derived by comparing first relevancy information relating to the first information and second relevancy information relating to the second information,
wherein the first information includes the first data block and a second data block, each data block being provided with a first relevancy rank, wherein the second information includes the first data block and the second data block, each being provided with a second relevancy rank, the end-of-search criterion being derived based on an amount of change between the first relevancy rank and the second relevancy rank.

14. The computer system of claim 13, wherein the relevance feedback is provided by a user of the user terminal, the second search query being derived using the relevance feedback provided by the user.

15. The computer system of claim 13 further comprising:
means for terminating the first retrieval procedure based on information provided by the end-search criterion; and
means for initiating a second retrieval procedure using a third search query having a second element that is not included in the first or second search query.

16. The computer system of claim 13, wherein the first information includes the first data block and a second data block, the system further comprising:
means for generating a plurality of relevancy patterns for the first and second data blocks; and
means for providing a plurality of end-search criterion values for the plurality of relevancy patterns, thereby providing predicted end-search criterion values for the user to review.

17. The computer system of claim 13, wherein the target information includes one selected from a group consisting of: text data, image data, or audio data, or a combination thereof.

* * * * *